US012744620B2

(12) United States Patent
So et al.

(10) Patent No.: US 12,744,620 B2
(45) Date of Patent: Sep. 22, 2026

(54) SEMICONDUCTOR DEVICE USING MULTI-LEVEL SIGNALING AND CODING METHOD THEREOF

(71) Applicant: SAMSUNG ELECTRONICS CO., LTD., Suwon-si (KR)

(72) Inventors: Hyejeong So, Suwon-si (KR); Changkyu Seol, Suwon-si (KR); Myoungbo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 18/793,395

(22) Filed: Aug. 2, 2024

(65) Prior Publication Data

US 2025/0226917 A1 Jul. 10, 2025

(30) Foreign Application Priority Data

Jan. 9, 2024 (KR) ........................ 10-2024-0003852

(51) Int. Cl.
*H04L 1/00* (2006.01)
*H04L 25/49* (2006.01)

(52) U.S. Cl.
CPC ........ *H04L 1/0057* (2013.01); *H04L 25/4917* (2013.01)

(58) Field of Classification Search
CPC . H04L 1/0057; H04L 25/4917; H04L 1/0042; H04L 1/0061; H04L 25/026
See application file for complete search history.

(56) References Cited

U.S. PATENT DOCUMENTS

| | | | |
|---|---|---|---|
| 7,620,116 B2 | 11/2009 | Bessios et al. | |
| 10,127,167 B2 | 11/2018 | Lee et al. | |
| 10,355,821 B2 * | 7/2019 | Kakande | G06N 7/01 |
| 11,146,430 B1 | 10/2021 | Lee et al. | |
| 11,316,613 B2 | 4/2022 | Jang et al. | |
| 12,057,983 B2 * | 8/2024 | Koike-Akino | H04L 27/2621 |
| 2002/0006166 A1 * | 1/2002 | Immink | H03M 7/46 |
| 2019/0280809 A1 * | 9/2019 | Cho | H04L 25/03343 |
| 2022/0294554 A1 | 9/2022 | Seol et al. | |
| 2022/0327067 A1 | 10/2022 | Seol et al. | |

FOREIGN PATENT DOCUMENTS

| | | | |
|---|---|---|---|
| CN | 113300722 | 8/2021 | |
| CN | 116232547 | 6/2023 | |
| EP | 3987665 B1 * | 5/2025 | H03M 13/3972 |

* cited by examiner

*Primary Examiner* — Albert Decady
*Assistant Examiner* — Kareem Fuad Alhwamdeh
(74) *Attorney, Agent, or Firm* — Fish & Richardson P.C.

(57) ABSTRACT

Disclosed is a semiconductor device transmitting a multi-level signal including: an encoder encoding user data into encoded data; and a transmission driver converting the encoded data into a multi-level signal. The encoder includes: a bit adder generating a codeword by adding at least one shaping parity bit to the user data; an encoding operator generating candidate encoded data by performing an encoding operation on the codeword; a metric operator calculating metric values by using a metric operation equation for the candidate encoded data; and a metric searcher searching for the metric values to select the encoded data from the candidate encoded data and provide the selected encoded data to the transmission driver.

20 Claims, 24 Drawing Sheets

FIG. 2

| PAM-4 symbol | 0 | 1 | 2 | 3 |
|---|---|---|---|---|
| 2bit data | 00 | 01 | 10 | 11 |

FIG. 3

| PAM-4 symbol | 0 | 1 | 2 | 3 |
| --- | --- | --- | --- | --- |
| 2bit data | 00 | 01 | 11 | 10 |

| All Level Transition | |
|---|---|
| Level Transition 3 | 0 → 3, 3 → 0 |
| Level Transition 2 | 0 → 2, 1 → 3, 3 → 1, 2 → 0 |
| Level Transition 1 | 0 → 1, 1 → 2, 2 → 3, 3 → 2, 2 → 1, 1 → 0 |
| Level Transition 0 | 0 → 0, 1 → 1, 2 → 2, 3 → 3 |

FIG. 7

User Data

| 0 | 0 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 0 | 0 | 0 | 1 | 0 | 1 |
| 0 | 0 | 0 | 0 | 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 1 | 0 | 0 | 0 | 1 |
| 0 | 0 | 0 | 0 | 0 | 0 | 0 | 0 | 0 | 0 | 1 | 1 | 0 | 0 | 1 | 1 |
| 0 | 0 | 0 | 0 | 0 | 0 | 0 | 0 | 0 | 1 | 0 | 1 | 0 | 1 | 0 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 1 | 0 | 0 | 0 | 0 | 0 | 0 | 0 | 1 |
| 0 | 0 | 0 | 0 | 0 | 0 | 1 | 1 | 0 | 0 | 0 | 0 | 0 | 0 | 1 | 1 |
| 0 | 0 | 0 | 0 | 0 | 1 | 0 | 1 | 0 | 0 | 0 | 0 | 0 | 1 | 0 | 1 |
| 0 | 0 | 0 | 0 | 1 | 1 | 1 | 1 | 0 | 0 | 0 | 0 | 1 | 1 | 1 | 1 |
| 0 | 0 | 0 | 1 | 0 | 0 | 0 | 1 | 0 | 0 | 0 | 1 | 0 | 0 | 0 | 1 |
| 0 | 0 | 1 | 1 | 0 | 0 | 1 | 1 | 0 | 0 | 1 | 1 | 0 | 0 | 1 | 1 |
| 0 | 1 | 0 | 1 | 0 | 1 | 0 | 1 | 0 | 1 | 0 | 1 | 0 | 1 | 0 | 1 |
| 1 | 1 | 1 | 1 | 1 | 1 | 1 | 1 | 1 | 1 | 1 | 1 | 1 | 1 | 1 | 1 |

FIG. 12

| 1 | 1 | 0 | 0 | 1 | 0 | 0 | 0 | 1 | 0 | 1 | 1 | 0 | 1 | 1 | 0 |
|---|---|---|---|---|---|---|---|---|---|---|---|---|---|---|---|
| 0 | 0 | 1 | 1 | 0 | 1 | 1 | 1 | 0 | 1 | 0 | 0 | 1 | 0 | 0 | 1 |
| 1 | 0 | 1 | 1 | 1 | 1 | 1 | 0 | 1 | 1 | 0 | 0 | 0 | 0 | 0 | 1 |
| 0 | 1 | 0 | 0 | 0 | 0 | 0 | 0 | 0 | 0 | 1 | 1 | 1 | 1 | 1 | 0 |

| | | | | | | | |
|---|---|---|---|---|---|---|---|
| 2 | 0 | 3 | 0 | 3 | 2 | 1 | 3 |
| 0 | 2 | 1 | 2 | 1 | 0 | 3 | 1 |
| 3 | 2 | 2 | 3 | 2 | 0 | 0 | 1 |
| 1 | 0 | 0 | 0 | 0 | 2 | 2 | 3 |

FIG. 14

| All Level Transition | | Number of Occurrences |
| --- | --- | --- |
| Level Transition 3 | 0→3 | $N_3$ |
| | 3→0 | |
| Level Transition 2 | 0→2 | $N_2$ |
| | 1→3 | |
| | 3→1 | |
| | 2→0 | |
| Level Transition 1 | 0→1 | $N_1$ |
| | 1→2 | |
| | 2→3 | |
| | 3→2 | |
| | 2→1 | |
| | 1→0 | |
| Level Transition 0 | 0→0 | $N_0$ |
| | 1→1 | |
| | 2→2 | |
| | 3→3 | |

FIG. 15

| All Level Transition pattern | | Number of Occurrences |
| --- | --- | --- |
| Level Transition 3 | 033 | $N_A$ |
| | 030 | $N_B$ |
| | 003 | $N_C$ |
| Level Transition 2 | 022 | $N_D$ |
| | 020 | $N_E$ |
| | 002 | $N_F$ |
| Level Transition 1 | 011 | $N_G$ |
| | 010 | $N_H$ |
| | 001 | $N_I$ |
| Level Transition 0 | 000 | $N_J$ |

FIG. 16

| Candidate Encoding Data | Level Transition | | | |
|---|---|---|---|---|
| | 0 | 1 | 2 | 3 |
| 1st | 0 | 2 | 2 | 3 |
| 2nd | 0 | 4 | 2 | 1 |
| 3rd | 2 | 4 | 1 | 0 |
| 4th | 4 | 2 | 1 | 0 |

FIG. 18

| Random coding | | | | |
|---|---|---|---|---|
| | Level 0 | Level 1 | Level 2 | Level 3 |
| Level 0 | 6.25% | 6.25% | 6.25% | 6.25% |
| Level 1 | 6.25% | 6.25% | 6.25% | 6.25% |
| Level 2 | 6.25% | 6.25% | 6.25% | 6.25% |
| Level 3 | 6.25% | 6.25% | 6.25% | 6.25% |

FIG. 19

| | Shaping coding | | | |
|---|---|---|---|---|
| | Level 0 | Level 1 | Level 2 | Level 3 |
| Level 0 | 5.32% | 6.77% | 6.79% | 5.31% |
| Level 1 | 6.78% | 4.74% | 7.47% | 6.79% |
| Level 2 | 6.81% | 7.47% | 4.75% | 6.79% |
| Level 3 | 5.31% | 6.79% | 6.79% | 5.32% |

FIG. 20

| | Random coding | Shaping coding | rate |
|---|---|---|---|
| Level Transition 0 | 25% | 20.13% | -19.48% |
| Level Transition 1 | 37.50% | 42.07% | 12.19% |
| Level Transition 2 | 25% | 27.18% | 8.72% |
| Level Transition 3 | 12.50% | 10.62% | -15.04% |

FIG. 21
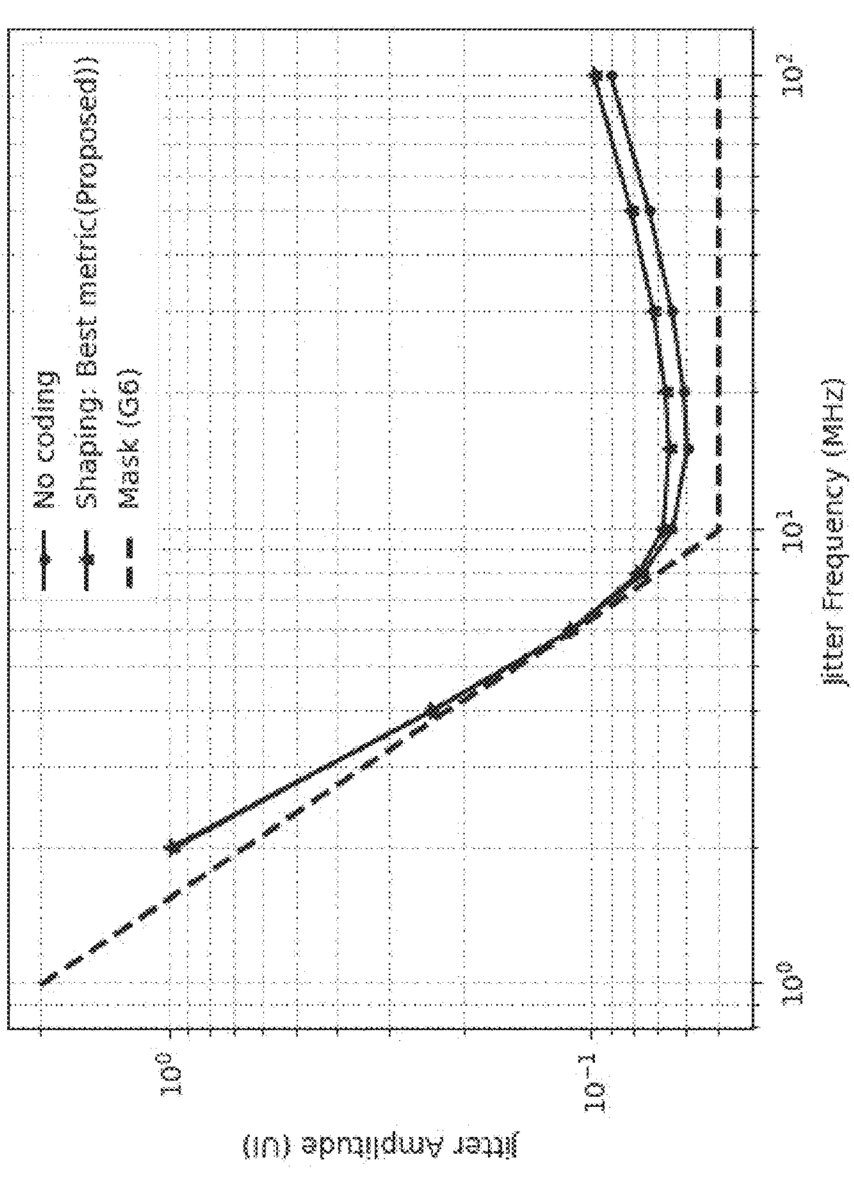

SEMICONDUCTOR DEVICE USING MULTI-LEVEL SIGNALING AND CODING METHOD THEREOF

CROSS-REFERENCE TO RELATED APPLICATION

This application claims priority under 35 U.S.C. § 119 to Korean Patent Application No. 10-2024-0003852 filed on Jan. 9, 2024, in the Korean Intellectual Property Office, the entirety of which is incorporated by reference herein.

BACKGROUND

Multi-level signaling is a transmission method used in data communication. A conventional binary system may only have two levels (0 and 1), and a multi-level signaling system may have multiple levels. Each level may have two or more bits of information. The multi-level signaling system may transmit more information with a single signal. Therefore, the multi-level signaling system may improve data transmission efficiency while maintaining or reducing power consumption. The multi-level signaling system may include a pulse amplitude modulation 4-level (PAM-4) signaling system. The PAM-4 signaling system expresses 2-bit data as one symbol, and one symbol may be mapped to any one of four levels. The PAM-4 signaling system has four levels and three eyes, and an openness of its eye patterns is smaller than that of NRZ (Non-Return-to-Zero). The smaller the openness of the eye patterns, the more PAM-4 signaling system is the more susceptible to jitter, noise and distortion. Accordingly, accuracy and performance of clock and data recovery (CDR) may be degraded.

SUMMARY

Various methods have been proposed to improve clock and data recovery (CDR) performance and improve the openness of the eye patterns. However, there are problems that make solutions difficult to apply, e.g., because the solutions may involve significant overhead. Some implementations according to the present disclosure provide semiconductor devices improving CDR and eye pattern in a multi-level signaling system, and coding methods therefor.

According to some implementations, a semiconductor device transmitting a multi-level signal includes: an encoder encoding user data into encoded data; and a transmission driver converting the encoded data into a multi-level signal. The encoder includes: a bit adder generating a codeword by adding at least one shaping parity bit to the user data; an encoding operator generating candidate encoded data by performing an encoding operation on the codeword; a metric operator calculating metric values by using a metric operation equation for the candidate encoded data; and a metric searcher searching for the metric values to select the encoded data from the candidate encoded data and provide the selected encoded data to the transmission driver.

According to some implementations, a semiconductor device includes: a transmitter transmitting a multi-level signal; and a receiver receiving the multi-level signal. The transmitter generates a codeword by adding at least a shaping parity bit to user data, generates candidate encoded data by performing an encoding operation on the codeword, calculates metric values using a metric operation equation for the candidate encoded data, selects encoded data from the candidate encoded data by searching the metric values, and converts the encoded data into the multi-level signal. The receiver restores the multi-level signal to the encoded data, decodes the codeword from the encoded data, and restores the user data from the codeword.

According to some implementations, a coding method for a semiconductor device supporting a multi-level signaling system includes: generating, in a bit addition operation, a codeword by adding at least a shaping parity bit to user data; generating, in an encoding operation, candidate encoded data by performing an encoding operation on the codeword; calculating, in a metric calculation operation, metric values using a metric operation equation for the candidate encoded data; and selecting, in a metric search operation, encoded data from the candidate encoded data by searching the metric values.

BRIEF DESCRIPTION OF THE FIGURES

The above and other objects and features of the present disclosure will become apparent by describing in detail examples thereof with reference to the accompanying drawings.

FIG. 2 is a table illustrating a relationship between PAM-4 symbols and data in a PAM-4 signaling system.

FIG. 3 is a table illustrating a relationship between PAM-4 symbols and data when Gray code is applied in FIG. 2.

FIG. 4 is a signal diagram illustrating an example of a PAM-4 signal.

FIG. 5 is a diagram illustrating level transition in a PAM-4 signaling system.

FIG. 7 is a diagram illustrating user data.

FIG. 11 is a diagram illustrating an example of a 16×16 polar code generator matrix.

FIG. 12 is a diagram illustrating an example of results of candidate encoded data.

FIG. 14 is a diagram illustrating an example of a number of occurrences for each level transition.

FIG. 15 is a diagram illustrating an example of a number of occurrences for each level transition pattern.

FIG. 16 is a diagram illustrating an example of a number of occurrences of level transitions for the candidate encoded data of FIG. 12.

FIG. 18 is a diagram illustrating an example of level transition probabilities during random coding.

FIG. 19 is a diagram illustrating an example of level transition probabilities during shaping coding.

FIG. 20 is a diagram illustrating a comparison of the sum of level transition probabilities in random coding in FIG. 18 and shaping coding in FIG. 19.

FIG. 21 is a diagram illustrating simulation results corresponding to a codeword that is 128-bits and a parity bit that is 2-bits.

DETAILED DESCRIPTION

Figure 1:
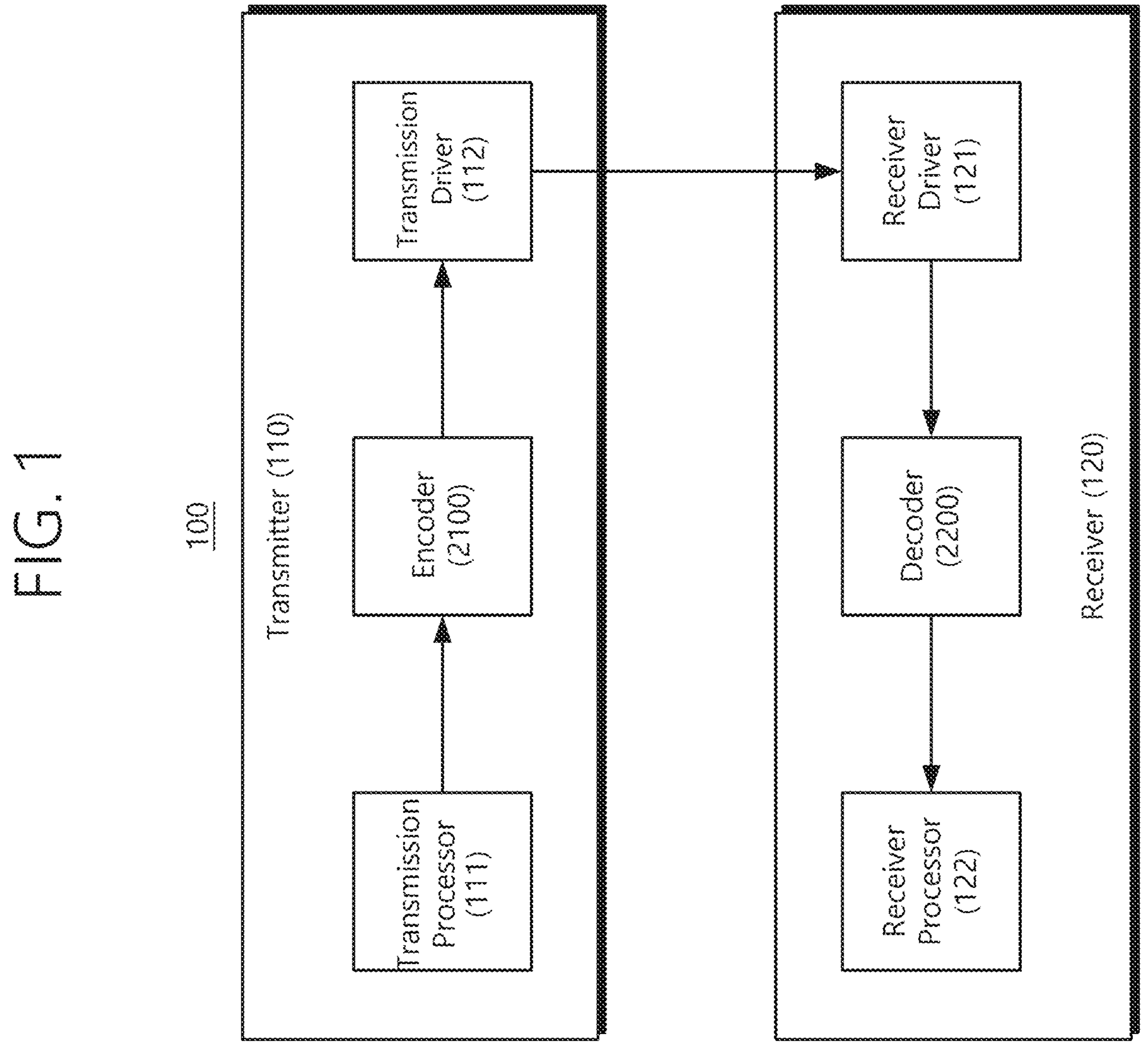
FIG. 1 is a block diagram illustrating an example of a semiconductor device.

FIG. 1 is a block diagram illustrating a semiconductor device that, in some implementations, provides improved CDR (clock and data recovery) and an eye pattern in a multi-level signaling system, according to some implementations of the present disclosure. FIG. 2 is a table illustrating a relationship between PAM-4 symbols and data in a PAM-4 signaling system. FIG. 3 is a table illustrating a relationship between PAM-4 symbols and data when Gray code is applied in FIG. 2.

Referring to FIG. 1, a semiconductor device 100 includes a transmitter 110 and/or a receiver 120. The semiconductor device 100 may be an integrated circuit, an electronic device or system, a smart phone, a tablet PC, a computer, a server, a work station, a portable communication terminal, a personal digital assistant (PDA), a portable multimedia player (PMP), a computing device such as another suitable computer, a virtual machine, or a virtual computing device of the virtual machine, etc. In some implementations, the semiconductor device 100 may be a portion of components included in a computing system, such as a graphics card.

The semiconductor device 100 may support pulse amplitude modulation (PAM). As an example, the PAM may include 4 levels PAM for 2-bit codes (PAM-4), 8 levels PAM for 3-bit codes (PAM-8), or 16-level PAM for 4-bit codes (PAM-16), etc., depending on the number of bits in a digital code. The semiconductor device 100 may support Gray coding.

The transmitter 110 and/or the receiver 120 may communicate through a data bus. The data bus is a plurality of signal lines physically or electrically connecting the transmitter 110 and/or the receiver 120. The transmitter 110, receiver 120 and/or the data bus may support the pulse amplitude modulation (PAM).

The transmitter 110 may generate encoded data by encoding user data. The transmitter 110 may generate a multi-level signal from the encoded data. The transmitter 110 may transmit the generated multi-level signal through the data bus. The data bus may transmit the encoded data to the receiver 120. The receiver 120 may receive the multi-level signal from the data bus. The receiver 120 may restore the encoded data from the multi-level signal. The receiver 120 may decode the user data from the restored encoded data.

The transmitter 110 includes a processor 111 (a transmission processor 111), an encoder 2100, and a driver 112 (a transmission driver 112).

The transmission processor 111 may generate the user data. The user data may be an n-bit data stream. As an example, each bit of the user data may be represented as 0 or 1. The transmission processor 111 may transmit the user data to the encoder 2100.

The encoder 2100 may receive the user data from the transmission processor 111. The encoder 2100 may encode the user data into the encoded data. The encoder 2100 may generate at least one codeword by adding a shaping parity bit to the user data. The encoder 2100 may generate at least one candidate encoded data from the codeword. The encoder 2100 may select one from at least one candidate encoded data as the encoded data according to a predetermined algorithm. The encoder 2100 may transmit the encoded data to the transmission driver 112.

The transmission driver 112 may receive the encoded data from the encoder 2100. The transmission driver 112 may convert the encoded data into a multi-level signal.

Referring to FIG. 2, PAM-4 may modulate two bits of user data into 4 level symbols. The transmission driver 112 may modulate 2-bit user data 00, 01, 10 and 11 into level 0, level 1, level 2 and level 3.

Referring to FIG. 3, the transmission driver 112 may use Gray code to encode the user data. The transmission driver 112 may modulate 2-bit user data 00, 01, 11 and 10 into level 0, level 1, level 2 and level 3.

As another example, PAM-8 may modulate 3-bits of user data into 8 level symbols.

The transmission driver 112 may transmit the converted multi-level signal through the data bus.

Referring to FIG. 1, the receiver 120 may receive the multi-level signal from the data bus. The receiver 120 may demodulate the encoded data from the multi-level signals. The receiver 120 may decode the codeword from the demodulated encoded data. The receiver 120 may restore the user data by removing the shaping parity bit from the codeword.

The receiver 120 includes a driver 121 (a receiver driver 121), a decoder 2200, and a processor 122 (a receiver processor 122).

The receiver driver 121 may demodulate the multi-level signal into the encoded data. In the multi-level signaling system, the receiver driver 121 may demodulate m multi-level signals into n-bit encoded data. The receiver driver 121 may transmit the encoded data to the decoder 2200.

The decoder 2200 may receive the encoded data from the receiver driver 121. The decoder 2200 may decode the codeword from the encoded data. The user data may be restored by removing the shaping parity bit from the codeword.

The receiver processor 122 may process the restored user data. The user data may be an n-bit data stream. As an example, each bit of the user data may be represented as 0 or 1.

Figure 4:
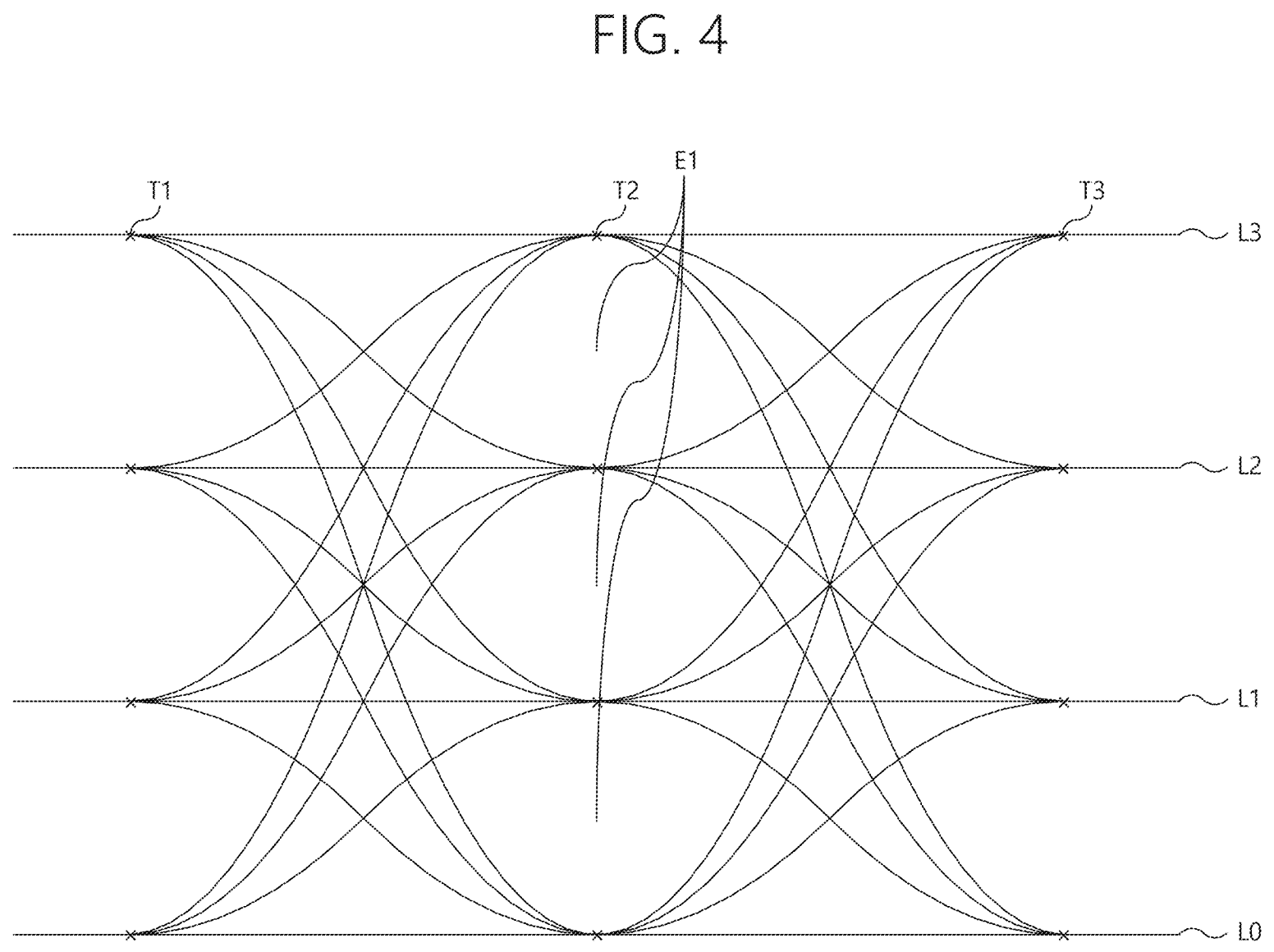

FIG. 4 is a signal diagram (an eye diagram) illustrating an example of a PAM-4 signal. FIG. 5 is a diagram illustrating level transition in a PAM-4 signaling system.

Referring to FIGS. 4 and 5, a PAM-4 signal may include four levels. The PAM-4 signal may include level 0 (L0), level 1 (L1), level 2 (L2) and/or level 3 (L3). As an example, the PAM-4 signal may include three sampling timings T1, T2 and T3.

Level transition may occur in the PAM-4 signaling system. The level transition refers to a change in level based on sampling timing. As an example, the PAM-4 signal may make a transition at level 0 (L0), level 1 (L1), level 2 (L2) or level 3 (L3) into level 0 (L0), level 1 (L1), level 2 (L2) or level 3 (L3). Therefore, the level transition may include 16 transition patterns.

In the PAM-4 signaling system, the level transition may include level transition 0, level transition 1, level transition 2 and/or level transition 3. The level transition 0 may include a case where a level before the transition and a level after the transition are the same. As an example, the level transition 0 may include transitions from level 0 to level 0, from level 1 to level 1, from level 2 to level 2, and from level 3 to level 3. The level transition 0 is difficult to match a sampling timing because the level before and after the transition is the same. When the level transition 0 occurs frequently, there is a problem that the performance of clock and data recovery (CDR) deteriorates.

The level transition 1 may include transitions from level 0 to level 1, from level 1 to level 2, from level 2 to level 3, from level 3 to level 2, from level 2 to level 1, and from level 1 to level 0. The level transition 2 may include transitions from level 0 to level 2, from level 1 to level 3, from level 3 to level 1, and from level 2 to level 0.

The level transition 3 may be the maximum level transition in the PAM-4. The level transition 3 may include transitions from level 0 to level 3 or from level 3 to level 0. The level transition 3 may worsen the eye pattern due to rapid level change.

When the maximum transition increases while improving the level transition 0, the eye pattern may be broken. Additionally, when the number of level transition 0s increases while improving the maximum transition, the performance of clock and data recovery (CDR) may deteriorate. Therefore, performance can be improved by simultaneously improving level transition 0 and maximum level transition.

Figure 6:
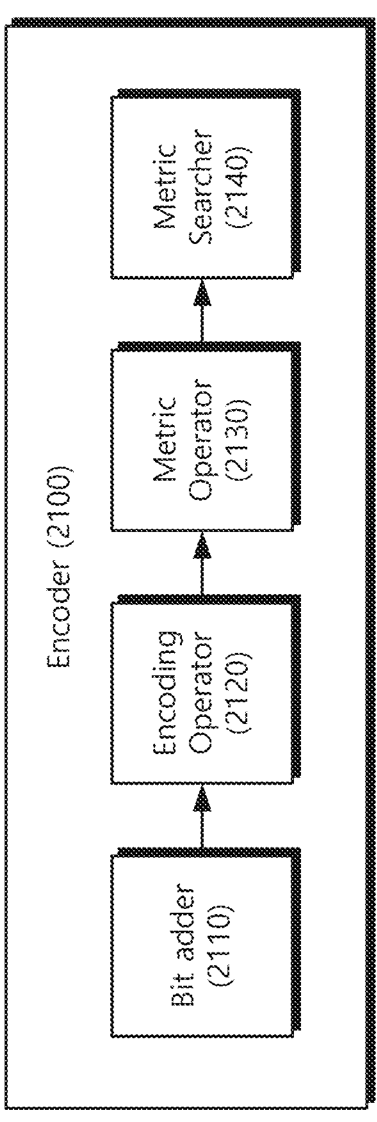
FIG. 6 is a block diagram illustrating an example of an encoder illustrated in FIG. 1.

FIG. 6 is a block diagram illustrating an encoder according to some implementations of the present disclosure, e.g., the encoder 2100 illustrated in FIG. 1.

Referring to FIG. 6, the encoder 2100 includes a bit adder 2110, an encoding operator 2120, a metric operator 2130, and a metric searcher 2140. The encoder 2100 may encode user data into encoded data.

The bit adder 2110 may receive user data from the transmission processor 211. The bit adder 2110 may add a shaping parity bit to user data. The bit adder 2110 may add a shaping parity bit to user data at a predetermined location. As an example, the predetermined location may be determined using channel information. As an example, a channel may represent the position of bit information (0 and 1) included in user data. As an example, the channel information may be a channel probability value calculated using a Bhattacharyya parameter for each channel. The bit adder 2110 may select a channel with the maximum or minimum value from the calculated channel probability value as the position of the shaping parity bit.

The bit adder 2110 may generate $2^p$ codewords by adding p-bits of shaping parity bits to user data.

The bit adder 2110 may select the number of bits according to the goal of the target pattern. Through the above-described process, the bit adder 2110 may maximize or minimize the target pattern even with a small number of bits.

Figure 7:
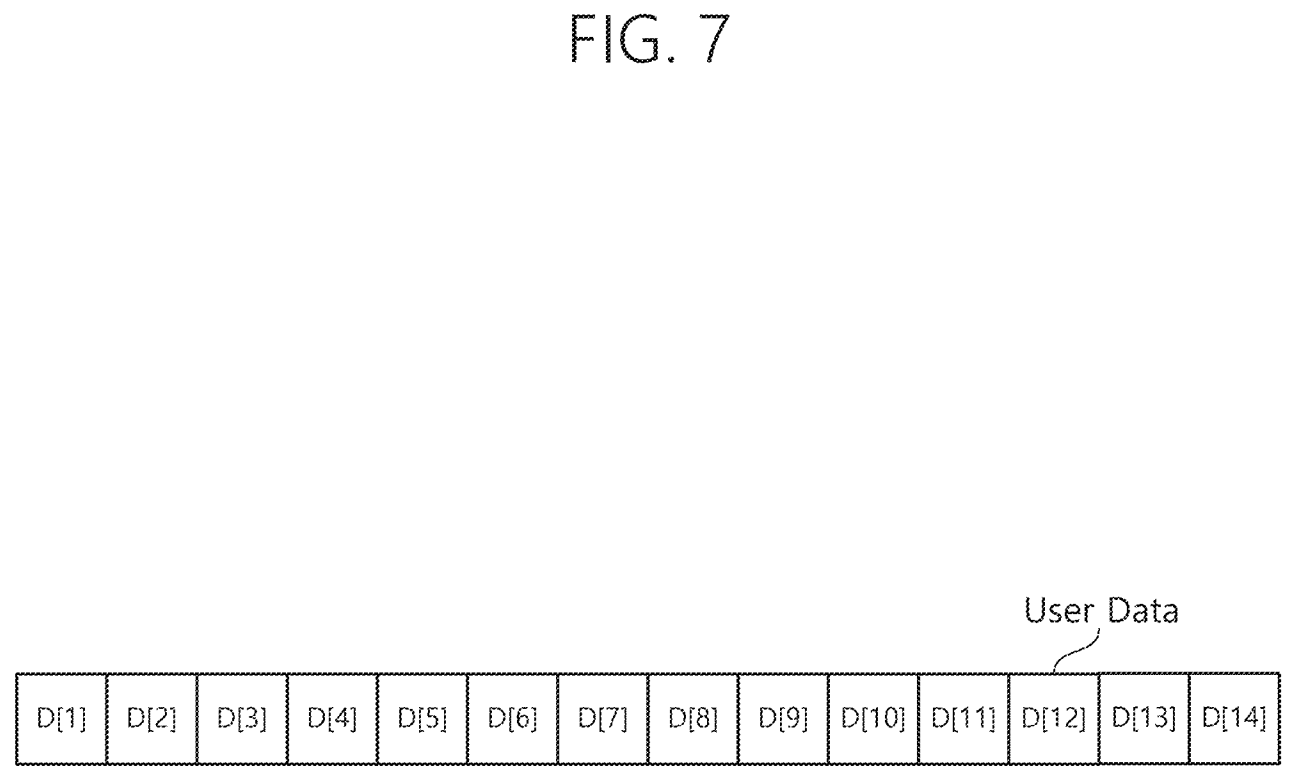
Figure 8:
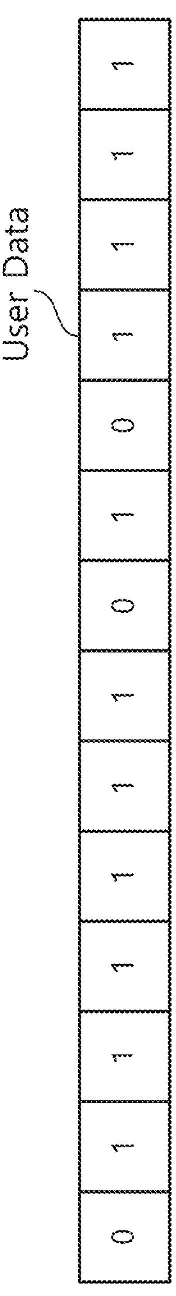
FIG. 8 is a diagram illustrating an example of actual data input as the user data of FIG. 7.
Figure 9:
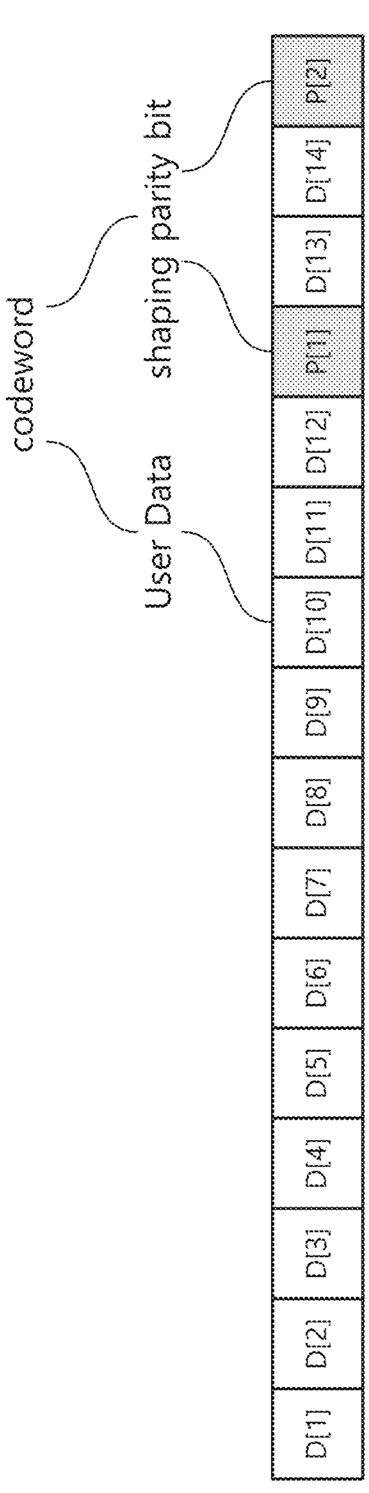
FIG. 9 is a diagram illustrating an example of a codeword generated by adding p-bits of shaping parity bits to the user data of FIG. 7.
Figure 10:
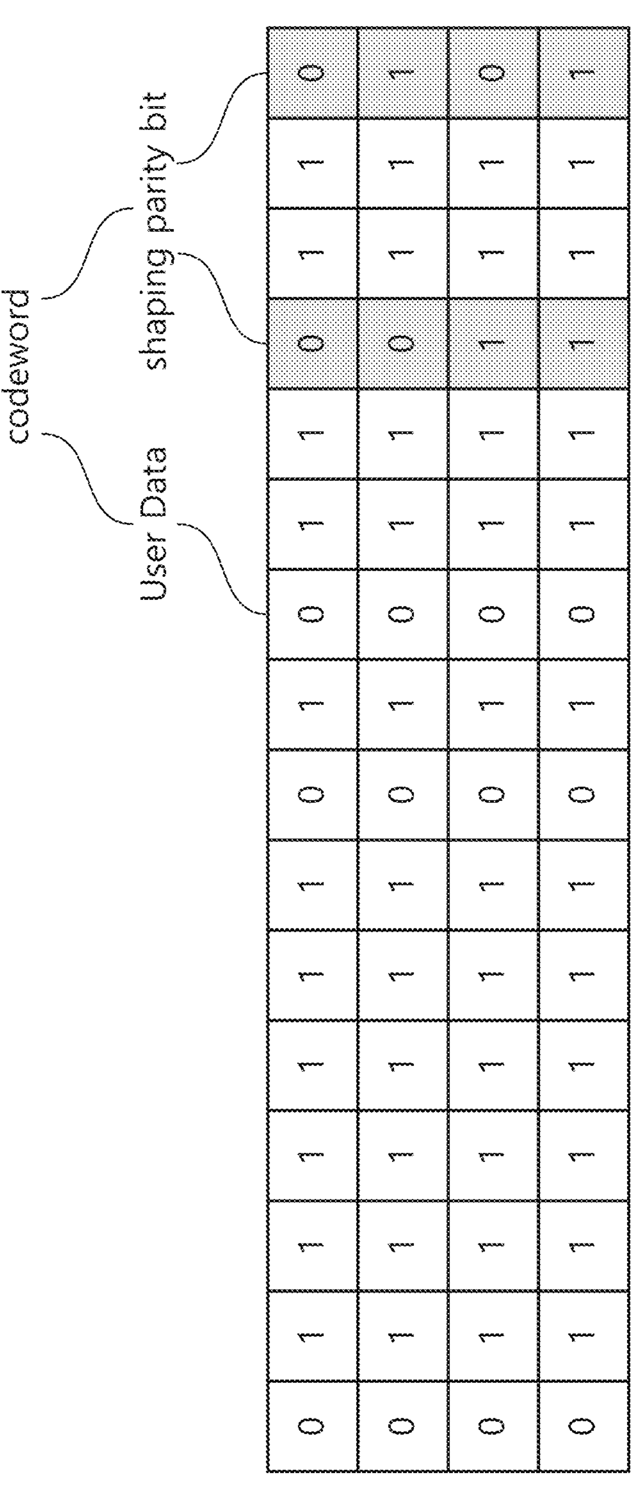
FIG. 10 is a diagram illustrating an example of $2^p$ codewords generated by adding p-bits shaping parity bits of FIG. 9.

FIG. 7 is a diagram illustrating user data. FIG. 8 is a diagram illustrating an example of actual data input as user data of FIG. 7. FIG. 9 is a diagram illustrating an example of a codeword generated by adding p-bits of shaping parity bits to the user data of FIG. 7. FIG. 10 is a diagram illustrating an example of $2^p$ codewords generated by adding p-bits shaping parity bits of FIG. 9.

Referring to FIGS. 7 and 9, the bit adder 2110 may receive 14-bit user data from the transmission processor 111. As an example, the bit adder 2110 may determine to add two bits of shaping parity bits to 14-bits of user data. Additionally, the bit adder 2110 may determine to add a shaping parity bit between D [12] and D [13] and after D [14].

The bit adder 2110 may generate a 16-bit codeword by adding two bits of shaping parity bits to 14-bits of user data. The size of the codeword generated by the bit adder 2110 may be formed as an exponent of 2, such as two bits, four bits, eight bits, 16 bits, and 32 bits.

Referring to FIGS. 8 and 10, the bit adder 2110 may receive 14-bit user data of 0111 1110 1011 11. The bit adder 2110 may generate $2^p$ codewords by adding p-bits of shaping parity bits. As an example, the bit adder 2110 may add two bits of shaping parity bits. The bit adder 2110 may add four types of shaping parity bits: 00, 01, 10, and 11. The bit adder 2110 may generate 4 codewords (that is, 22).

The encoding operator 2120 may perform an encoding operation on the $2^p$ codewords generated by the bit adder 2110. The encoding operator 2120 may generate $2^p$ candidate encoded data as a result of performing the encoding operation. As an example, the encoding operation may include an operation using a polar code generator matrix. The encoding operator 2120 may perform the operation using the polar code generator matrix for each codeword. As an example, the polar code generator matrix be a generator matrix based on a polar code. The encoding operator 2120 may generate candidate encoded data as a result of the operation of the polar code generator matrix. Accordingly, the encoding operator 2120 may generate the same number of candidate encoded data as the number of codewords.

The polar code generator matrix may be generated by repeating a Kronecker product operation of a kernel matrix. The kernel matrix may represent a 2×2 triangular matrix whose non-zero components are 1. The kernel matrix may be expressed as Equation 1.

$$\text{Kernel} = \begin{pmatrix} 1 & 0 \\ 1 & 1 \end{pmatrix} \qquad \text{[Equation 1]}$$

The encoding operator 2120 may generate an N×N polar code generator matrix. As an example, a method for generating the N×N polar code generator matrix may be expressed as Equation 2.

$$G_N = G^{\otimes n} \qquad \text{[Equation 2]}$$

G: Polar code generation matrix

⊗: Kronecker product n: exponent

FIG. 11 is a diagram illustrating an example of a 16×16 polar code generator matrix.

Referring to FIG. 11, a 16×16 polar code generator matrix may be generated through three Kronecker product operations.

Figure 12:
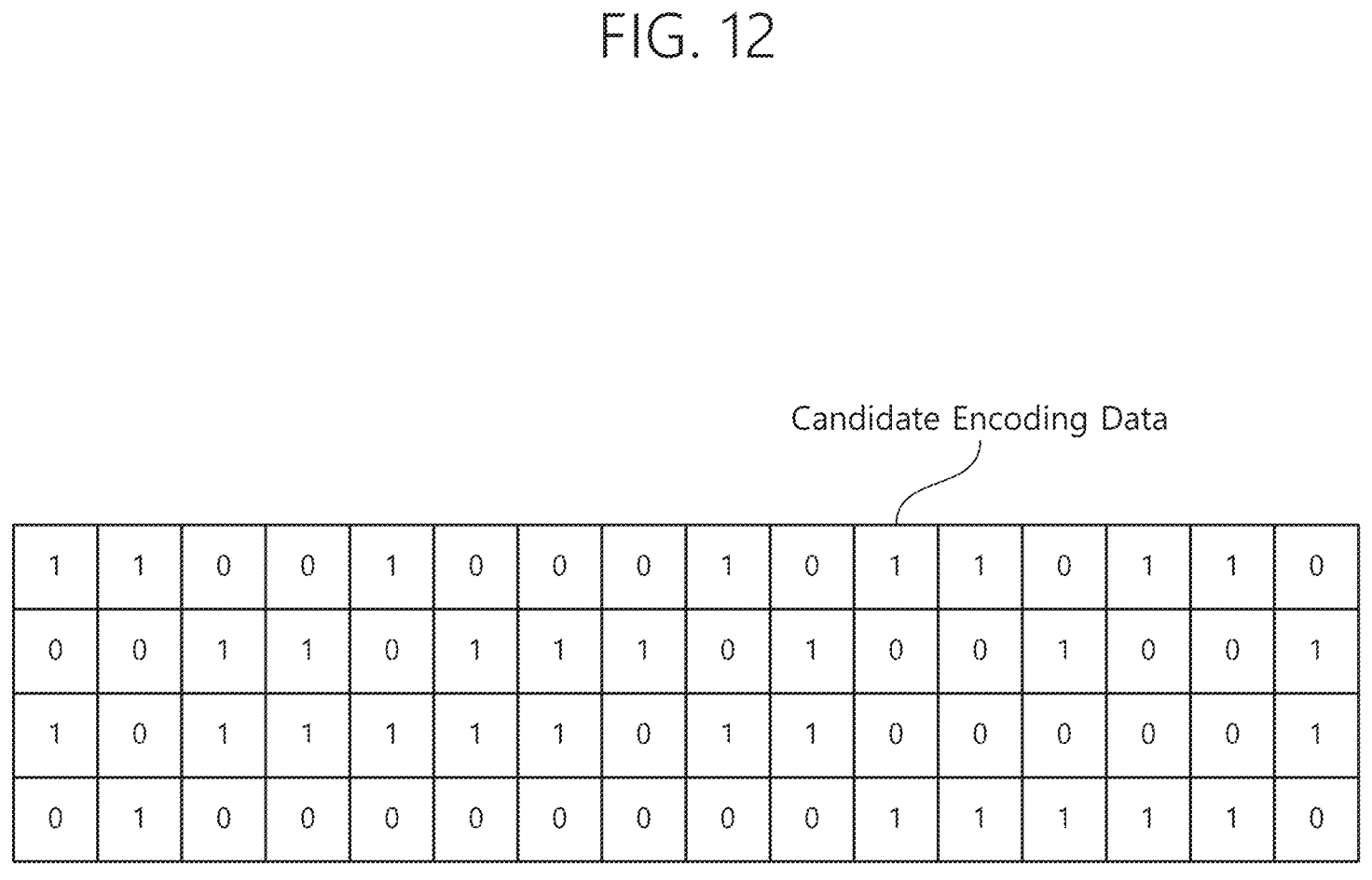

FIG. 12 is a diagram illustrating an example of results of candidate encoded data.

Referring to FIG. 12, the encoding operator 2120 may perform a multiplication operation between a codeword and a polar code generator matrix. The encoding operator 2120 may perform a modulo operation on the result of the multiplication operation. The encoding operator 2120 may obtain candidate encoded data as a result of the modulo operation. For example, the encoding operator 2120 may perform a multiplication operation between the codeword of FIG. 10 and the polar code generator matrix of FIG. 11 to obtain the result of FIG. 12, which is candidate encoded data.

Figure 13:
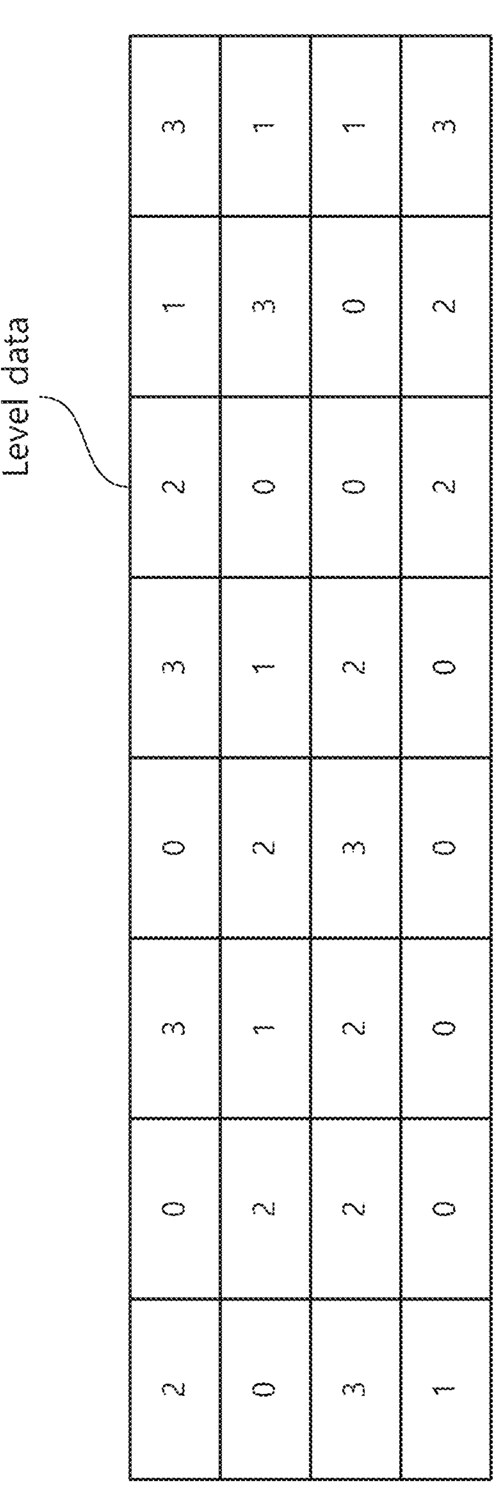
FIG. 13 is a diagram illustrating an example of values obtained by converting candidate encoded data into levels.

FIG. 13 is a diagram illustrating an example of values obtained by converting candidate encoded data into levels.

Referring to FIG. 13, the metric operator 2130 may convert candidate encoded data into level data. As an example, the first two bits of FIG. 12 are 11, and may be converted to 2 by applying Gray coding.

FIG. 14 is a diagram illustrating an example of the number of occurrences for each level transition.

Referring to FIG. 14, the metric operator 2130 may count the number of occurrences of the target pattern in the level data. The metric operator 2130 may apply the number of occurrences of the target pattern to the metric operation equation. The metric operator 2130 may calculate a metric value for each candidate encoded data by applying the metric operation equation. As an example, the target pattern may include a target level and a target transition.

The metric operator 2130 may calculate a metric value by applying a metric operation equation to the candidate encoded data. As an example, the metric value may be an indicator for selecting encoded data from candidate encoded data. The metric operator 2130 may include at least one metric operation equation (or metric operation expression). As an example, the metric operation equation may be determined in advance. The metric operation equation may include a first operation equation in which level transition 0 occurs less frequently. As an example, when fewer level transition zeros occur, performance of the clock and data recovery (CDR) may be improved. Additionally, the metric operation equation may include a second operation equation that causes fewer maximum level transitions. As an example, when fewer maximum level transitions occur, eye margin performance may be improved.

The metric operation equation may include a third operation equation generated by combining the first operation equation and the second operation equation. The metric operation equation may include a fourth operation equation generated by combining the first operation equation, weighted by a value, and the second operation equation, weighted by a value. In some implementations, at least one metric operation equation may be created by combining operation equations in various ways.

The metric operator 2130 may select one of the operation equations as the metric operation equation according to the target pattern. As an example, the target pattern may include a target level, a target symbol, and a target level transition. The metric operator 2130 may calculate a metric value using the selected metric operation equation. The metric operator 2130 may set the calculation equation so that level transition 0 appears less frequently in order to improve clock and data recovery performance. As an example, the operation equation (expression) may be expressed as Equation 3 ($M_0$) or Equation 4 ($M_1$) so that level transition 0 appears less frequently.

$$M_0 = N_0 \quad \text{[Equation 3]}$$

$$M_1 = C - N_0 \quad \text{[Equation 4]}$$

The metric operator 2130 may select candidate encoded data in which level transition 0s appear less frequently. According to Equation 3, the metric operator 2130 may select candidate encoded data with the smallest metric value. According to Equation 4, the metric operator 2130 may select candidate encoded data with the largest metric value. The metric operator 2130 may select candidate encoded data in which level transition 0s appear less frequently.

The metric operator 2130 may set an equation so that the maximum level transition is small in order to improve eye margin performance. As an example, the operation equation (operation expression) may be expressed as Equation 5 ($M_2$) or Equation 6 ($M_6$) so that the maximum level transition appears less.

$$M_2 = N_3 \quad \text{[Equation 5]}$$

$$M_3 = C - N_3 \quad \text{[Equation 6]}$$

The metric operator 2130 may select candidate encoded data which shows a small maximum level transition. According to Equation 5, the metric operator 2130 may select candidate encoded data with the smallest metric value. According to Equation 6, the metric operator 2130 may select candidate encoded data with the largest metric value. The metric operator 2130 may select candidate encoded data in which level transition 0s appear less frequently.

The metric operator 2130 may select candidate encoded data which has a low level transition of 0 and a low maximum level transition. For example, the metric operator 2130 may generate a metric operation equation by combining Equation 3 and Equation 5. Additionally, as an example, the metric operator 2130 may generate a metric operation equation by combining Equation 4 and Equation 6. The resulting metric operation equation may be expressed as Equation 7 or Equation 8.

$$M_5 = N_0 + N_3 \quad \text{[Equation 7]}$$

$$M_6 = C - N_0 - N_3 \quad \text{[Equation 8]}$$

The metric operator 2130 may calculate the metric value as the sum of the level transition 0 and the maximum level transition. Additionally, the metric operator 2130 may calculate the metric value by subtracting the level transition 0 and the maximum level transition from the constant C.

According to Equation 7, the metric operator 2130 may select candidate encoded data with the smallest metric value. According to Equation 8, the metric operator 2130 may select candidate encoded data with the largest metric value.

The metric operator 2130 may assign weights to the number of occurrences. The metric operator 2130 may consider the target pattern by assigning weights. A system in which improvement in clock and data recovery performance is more important than improvement in eye margin is taken as a non-limiting example. The metric operator 2130 may only slightly consider improving the eye margin and assign weights to N0 and/or N3 to significantly improve clock and data recovery performance. As an example, the weighted metric operation equation may be expressed as Equation 9 or Equation 10.

$$M_7 = 3 \times N_0 + N_3 \quad \text{[Equation 9]}$$

$$M_8 = C - 3 \times N_0 - N_3 \quad \text{[Equation 10]}$$

FIG. 15 is a diagram illustrating an example of the number of occurrences for each level transition pattern.

Referring to FIG. 15, the metric operator 2130 may count the number of occurrences of each level transition pattern. As an example, the metric operator 2130 may treat a level transition of 0 as one value ($N_J$) regardless of the starting level. In case of level transition 3, the metric operator 2130 may count the 033 pattern, 030 pattern, and 003 pattern by dividing them by their respective values ($N_A$, $N_B$, and $N_C$). The metric operator 2130 may reflect ($N_A$, $N_B$, and $N_C$) in the metric operation equation to select candidate encoded data with fewer occurrences of level transition 3 patterns.

The metric operator 2130 may generate a metric operation equation by assigning weights to the number of occurrences according to Equation 11.

$$M = C + w_A N_A + w_B N_B + w_C N_C + \ldots + w_Z N_Z \quad \text{[Equation 11]}$$

In Equation 11, the variables have the following meanings:

M: Metric value

Figure 17:
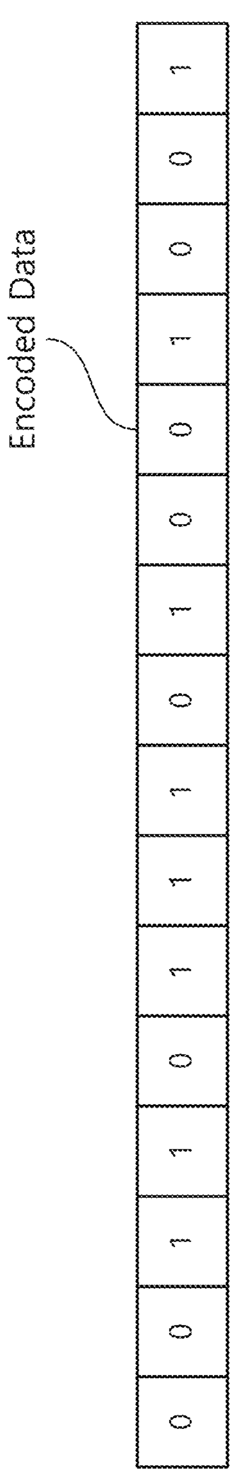
FIG. 17 is a diagram illustrating an example of encoded data.

C: constant value $N_A$, $N_B$, $N_C$, . . . , $N_Z$: Number of occurrences of target pattern $\omega_A$, $\omega_B$, $\omega_C$, . . . , $W_Z$: Weights for number of occurrences FIG. 16 is a diagram illustrating an example of the number of occurrences of level transitions for the candidate encoded data of FIG. 12. FIG. 17 is a diagram illustrating an example of encoded data.

Referring to FIGS. 16 and 17, the metric searcher 2140 may search for metric values and select encoded data from candidate encoded data based on the search results. The metric searcher 2140 may select candidate encoded data whose metric value is the maximum or minimum value as encoded data.

As an example, the number of level transition occurrences of the first candidate encoded data is level transition 0 at 3 times, level transition 1 at 2 times, level transition 2 at 2 times, and level transition 3 at 0 times. The number of level transitions in the second candidate encoded data is 1 for level transition 0, 2 for level transition 1, 4 for level transition 2, and 0 for level transition 3. The number of level transitions in the third candidate encoded data is 0 for level transition 0, 1 for level transition 1, 4 for level transition 2, and 2 for level transition 3. The number of level transitions in the fourth candidate encoded data is 3 for level transition 0, 1 for level transition 1, 2 for level transition 2, and 4 for level transition 3.

Applying Equation 7, the metric value of the first candidate encoded data is 3, and the metric value of the second candidate encoded data is 1. Additionally, the metric value of the third candidate encoded data is 2, and the result of the fourth candidate encoded data is 4.

Equation 7 is a metric operation equation for minimizing level transition 0 and maximum level transition. Accordingly, the metric searcher 2140 may select candidate encoded data with the smallest metric value. As an example, the metric value of the second candidate encoded data is 1, which is the smallest. Accordingly, the metric searcher 2140 may select the second candidate encoded data as encoded data (referring to FIG. 17).

FIG. 18 is a diagram illustrating an example of level transition probabilities during random coding. FIG. 19 is a diagram illustrating an example of level transition probabilities during shaping coding. FIG. 20 is a diagram illustrating a comparison between the sum of level transition probabilities in random coding in FIG. 18 and shaping coding in FIG. 19.

Referring to FIG. 18, the transition rates are randomly. When the data is randomly distributed, the probability of level transition occurring is the same, so each may be 6.25%.

Referring to FIG. 19, the transition rates are based on the shaping coding described herein. By applying the shaping code of the present disclosure, it may be seen that level transition 0 and level transition 3 are smaller than 6.25%. Additionally, it may be seen that level transition 1 and level transition 2 have increased to more than 6.25%.

Referring to FIG. 20, the number of cases of level transition 0 during random coding is 4, which is 25% (6.25*4). Since the number of cases of level transition 1 is 6, it is 37.5% (6.25*6). Since the number of cases of level transition 2 is 4, it is 25% (6.25*4). Lastly, the number of cases of level transition 3 is 2, so it is 12.5% (6.25*2).

In shaping coding of the present disclosure, the occurrence rate of level transition 0 is 20.13%, the occurrence rate of level transition 1 is 42.07%, the occurrence rate of level transition 2 is 27.18%, and the occurrence rate of level transition 3 is 10.62%. The occurrence rates have been favorably modified. Therefore, it may be seen that the occurrence rate of level transition 0 decreased by 19.48%, and the occurrence rate of level transition 3 decreased by 5.32%. Comparatively, the occurrence rate of level transition 1 increased by 12.19%, and the occurrence rate of level transition 2 increased by 8.72%.

FIG. 21 is a diagram illustrating simulation results when a codeword is 128-bits and a parity bit is 2-bits.

Referring to FIG. 21, it may be seen that the jitter amplitude is improved compared to the case where no coding is applied, such as random coding.

Figure 22:
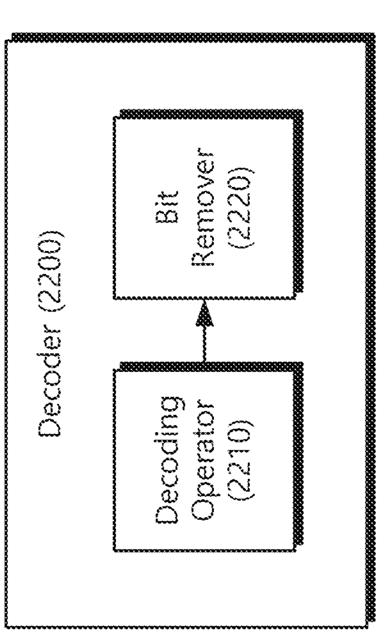
FIG. 22 is a block diagram illustrating an example of a decoder.

FIG. 22 is a block diagram illustrating an example of a decoder, e.g., the decoder 2200 illustrated in FIG. 1.

Referring to FIG. 22, the decoder 2200 may include a decoding operator 2210 and a bit remover 2220. The decoder 2200 may decode encoded data into user data.

The decoding operator 2210 may perform a decoding operation on encoded data. As an example, a decoding operation refers to a multiplication operation of a polar code generator matrix. The decoding operator 2210 may perform a decoding operation to decode the codeword.

The bit remover 2220 may restore user data by removing the shaping parity bit from the decoded codeword. The bit remover 2220 may remove the shaping parity bit added by the bit adder 2110 from the codeword.

Figure 23:
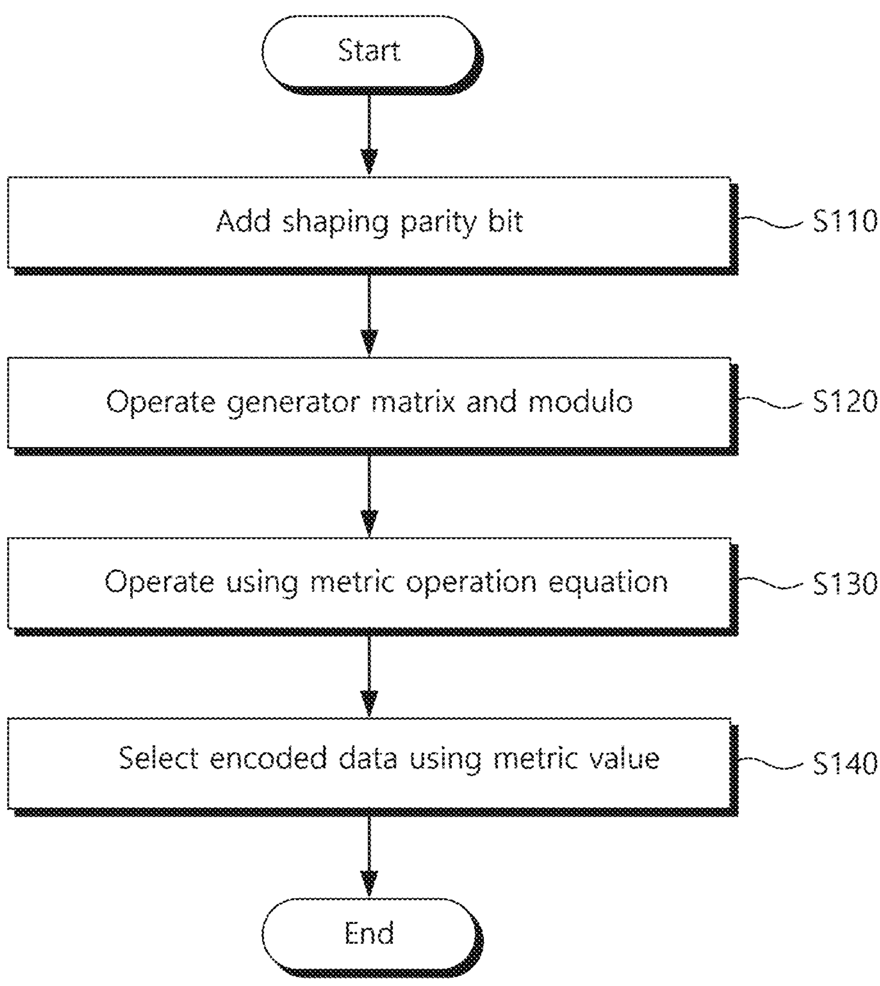
FIG. 23 is a flowchart illustrating an example of an encoding method of an encoder.

FIG. 23 is a flowchart illustrating an example of an encoding method of an encoder, such as the encoder 2100.

Referring to FIG. 23, the encoder 2100 may encode user data into encoded data.

In operation S110, the encoder 2100 may add a shaping parity bit to user data.

The encoder 2100 may determine the location of the shaping parity bit added to user data using channel information. The encoder 2100 may generate $2^p$ codewords by adding p-bits of shaping parity bits to user data.

In operation S120, the encoder 2100 may generate $2^p$ candidate encoded data from $2^p$ codewords. The encoder 2100 may perform an encoding operation. As an example, the encoding operation may include a polar code generator matrix operation, e.g., multiplication. The encoder 2100 may generate candidate encoded data as a result of performing an encoding operation. The encoding operator 2120 may generate the same number of candidate encoded data as the number of codewords. Operation S120 can include modulo operation. In operation S130, the encoder 2100 may calculate a metric value by applying a metric operation equation to the candidate encoded data. As an example, the metric value is an indicator for selecting encoded data from candidate encoded data. The encoder 2100 may include at least one metric operation equation. As an example, the metric operation equation may be determined in advance. A metric operation equation may be created by a combination of at least one operation.

The encoder 2100 may obtain level data from candidate encoded data. The encoder 2100 may count the number of occurrences of the target pattern in level data. The encoder 2100 may derive a metric value by substituting the number of occurrences of the target pattern into a metric operation equation. As an example, the encoder 2100 may generate a number of metric values equal to the number of candidate encoded data and the number of codewords.

The encoder 2100 may select one of the operation equations as the metric operation equation according to the target pattern. As an example, the target pattern may include a target level, a target symbol, and a target level transition. The encoder 2100 may calculate a metric value using the selected metric operation equation.

In operation S140, the encoder 2100 may select encoded data from candidate encoded data using the metric value. For example, the encoder 2100 may select candidate encoded data whose metric value is the maximum or minimum value as encoded data.

Figure 24:
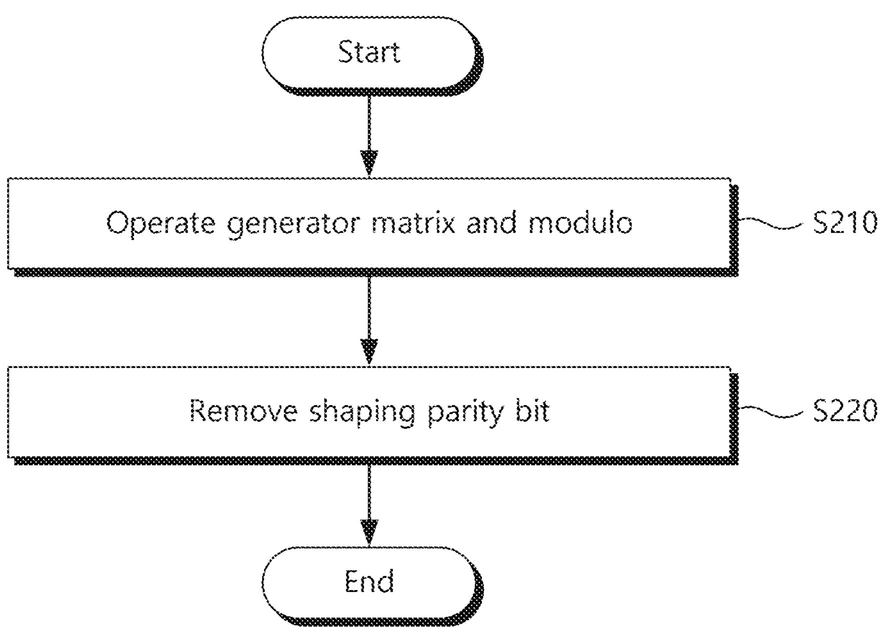
FIG. 24 is a flowchart illustrating an example of a decoding method of a decoder.

FIG. 24 is a flowchart illustrating an example of a decoding method of a decoder, e.g., decoder 2200.

Referring to FIG. 24, the decoder 2200 may decode user data from encoded data.

In operation S210, the decoder 2200 may obtain a codeword from the encoded data. The decoder 2200 may perform a multiplication operation of the polar code generator matrix on the encoded data. The decoder 2200 may obtain a codeword by performing a multiplication operation and, in some implementations, a modulo operation.

In operation S220, the decoder 2200 may restore user data from the codeword. The decoder 2200 may remove the shaping parity bit from the codeword. The decoder 2200 may restore user data by removing the shaping parity bit.

According to some implementations of the present disclosure, clock and data recovery (CDR) and eye pattern in a multi-level signaling system can be improved, even with low overhead.

It will be understood that various elements described above, such as the transmission processor 111, the encoder 2100, the transmission driver 112, the receiver driver 121, the decoder 2200, the receiver processor 122, the bit adder 2110, the encoding operator 2120, the metric operator 2130, the metric searcher 2140, the decoding operator 2210, and the bit remover 2220, can be implemented in digital electronic circuitry, or in computer hardware, firmware, software, or in combinations of them. These elements/modules can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment. In some implementations, these elements/modules are implemented at least partially by specially-configured hardware/circuitry. Further, these elements/modules can be configured to perform operations based on the circuitry of the elements/modules and/or based on stored instructions (e.g., non-transitory instructions stored in a memory or other storage) that, when executed by one or more processors of the elements/modules, cause the one or more processors to perform the operations.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the con text of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A semiconductor device comprising:

an encoder configured to encode user data into encoded data; and a transmission driver configured to convert the encoded data into a multi-level signal, wherein the encoder is configured to:

generate a plurality of codewords by adding a corresponding plurality of different sets of at least one shaping parity bit to the user data;

generate a plurality of candidate encoded data by performing an encoding operation on the plurality of codewords;

calculate metric values based on the plurality of candidate encoded data using a metric operation equation; and select the encoded data from the plurality of candidate encoded data based on the metric values, and provide the encoded data to the transmission driver.

2. The semiconductor device of claim 1, wherein the encoder is configured to:

determine at least one location of the user data at which the plurality of different sets of at least one shaping parity bit are to be added; and add the plurality of different sets of at least one shaping parity bit to the user data at the at least one location.

3. The semiconductor device of claim 2, wherein the encoder is configured to determine the at least one location based on channel information.

4. The semiconductor device of claim 3, wherein determining the at least one location comprises:

calculating, as the channel information, a channel probability value for each channel using a Bhattacharyya parameter, and selecting, as the at least one location at which the plurality of different sets of at least one shaping parity bit are to be added, a channel having a maximum or minimum value of the channel probability value.

5. The semiconductor device of claim 4, wherein adding the plurality of different sets of at least one shaping parity bit to the user data comprises adding p bits of shaping parity bits to the user data to generate $2^p$ codewords as the plurality of codewords.

6. The semiconductor device of claim 5, wherein performing the encoding operation comprises performing the encoding operation on the $2^p$ codewords to generate $2^p$ candidate encoded data as the plurality of candidate encoded data.

7. The semiconductor device of claim 6, wherein the encoding operation includes an operation using a polar code generator matrix, and the polar code generator matrix is generated by repeating a Kronecker product operation of a kernel matrix.

8. The semiconductor device of claim 1, wherein the encoder is configured to select the metric operation equation from a plurality of operation equations based on controlling a number of occurrences of a specific level, a specific transition, or a specific pattern.

9. The semiconductor device of claim 8, wherein the plurality of operation equations comprise:

a first operation equation configured to generate fewer level transition 0s;

a second operation equation configured to generate fewer maximum level transitions; and a third operation equation based on a combination of the first operation equation and the second operation equation.

10. The semiconductor device of claim 1, wherein selecting the encoded data from the plurality of candidate encoded data comprises selecting, as the encoded data, a candidate encoded data whose metric value is a maximum or minimum value.

11. A semiconductor device comprising:

a transmitter configured to transmit a multi-level signal; and a receiver configured to receive the multi-level signal, wherein the transmitter is configured to:

generate a plurality of codewords by adding a corresponding plurality of different sets of at least one shaping parity bit to user data, generate a plurality of candidate encoded data by performing an encoding operation on the plurality of codewords, calculate metric values based on the plurality of candidate encoded data using a metric operation equation, select encoded data from the plurality of candidate encoded data based on the metric values, and convert the encoded data into the multi-level signal, and wherein the receiver is configured to restore the multi-level signal to the encoded data, decode a codeword corresponding to the encoded data from the encoded data, and restore the user data from the codeword.

12. The semiconductor device of claim 11, wherein the receiver comprises:

a decoding operator configured to decode the codeword by performing a decoding operation on the encoded data; and a bit remover configured to restore the user data by removing the at least one shaping parity bit added to the codeword from a specified position of the codeword.

13. The semiconductor device of claim 12, wherein the decoding operation comprises a multiplication operation using a polar code generator matrix.

14. The semiconductor device of claim 11, wherein adding the plurality of different sets of at least one shaping parity bit to the user data comprises adding p bits of shaping parity bits to the user data to generate $2^p$ codewords as the plurality of codewords.

15. The semiconductor device of claim 11, wherein the multi-level signal is modulated with 4-level pulse amplitude modulation (PAM-4).

16. A coding method for a semiconductor device supporting a multi-level signaling system, the method comprising:

generating a plurality of codewords by adding a plurality of different sets of at least one shaping parity bit to user data;

generating a plurality of candidate encoded data by performing an encoding operation on the plurality of codewords;

calculating metric values based on the plurality of candidate encoded data using a metric operation equation; and selecting encoded data from the plurality of candidate encoded data based on the metric values.

17. The method of claim 16, wherein adding the plurality of different sets of at least one shaping parity bit comprises:

determining at least one location of the user data at which the plurality of different sets of at least one shaping parity bit are to be added; and adding the plurality of different sets of at least one shaping parity bit to the user data at the at least one location.

18. The method of claim 17, wherein generating the plurality of codewords comprises generating, as the plurality of codewords, $2^p$ codewords by adding p bits of shaping parity bits.

19. The method of claim 18, wherein performing the encoding operation comprises performing the encoding operation on the $2^p$ codewords to generate, as the plurality of candidate encoded data, $2^p$ candidate encoded data.

20. The method of claim 19, wherein calculating the metric values comprises calculating $2^p$ metric values corresponding to the $2^p$ candidate encoded data.

* * * * *